United States Patent [19]

Longley

[11] 4,249,628
[45] Feb. 10, 1981

[54] SYSTEM OF CONTROL FOR SURFACE EFFECT VEHICLE

[75] Inventor: Timothy J. R. Longley, Gosport, England

[73] Assignee: Ingles Hovercraft Associates Limited, Kent, England

[21] Appl. No.: 967,730

[22] Filed: Dec. 8, 1978

[30] Foreign Application Priority Data

Dec. 9, 1977 [GB] United Kingdom ............... 51387/77

[51] Int. Cl.³ .............................................. B60V 1/11
[52] U.S. Cl. ................................. 180/117; 114/67 A
[58] Field of Search ..................... 180/117, 118, 120; 114/67 A

[56] References Cited

U.S. PATENT DOCUMENTS

| | | | |
|---|---|---|---|
| 3,463,263 | 8/1969 | Winter | 180/117 |
| 3,486,577 | 12/1969 | Jackes | 180/120 |
| 3,730,298 | 5/1973 | Schouw | 180/120 |
| 3,869,020 | 3/1975 | Holland | 180/120 |
| 4,071,207 | 1/1978 | Piasecki | 180/118 |

Primary Examiner—John A. Pekar
Attorney, Agent, or Firm—Oblon, Fisher, Spivak, McClelland & Maier

[57] ABSTRACT

The invention provides the means for controlling the direction of travel of a surface effect vehicle, that is a vehicle arranged to be supported above a land or water surface, the control means comprising differentially operable aileron like flaps arranged to selectively exert a tilting moment on the craft about its longitudinal axis during motion to assist in the control of the vehicle during a turn. The craft is preferably provided with two fan propulsion units and the aileron like flaps are preferably arranged in the slipstream of those fan units. The aileron like flaps may also be used to control differentially the thrust of such fan units for steering purposes alone or in conjunction with conventional rudders.

15 Claims, 11 Drawing Figures

SYSTEM OF CONTROL FOR SURFACE EFFECT VEHICLE

BACKGROUND OF THE INVENTION

This invention relates to surface effect vehicles and is particularly concerned with the control of the vehicle when it is in motion. The invention also relates to various constructional features of a small surface effect vehicle.

Hitherto most light surface effect vehicles have relied on vertically hinged rudders or vanes to achieve directional control. The use of such hinged rudders has brought with it undesirable side effects, and such light craft have lacked really positive control of their motion over the ground or water.

It is an object of the present invention to provide a means whereby a light surface effect vehicle may be more positively controlled in operation. While the invention is particularly directed to small and light surface effect vehicles, it is not limited to such craft and is applicable to larger personnel and freight carrying craft.

SUMMARY OF THE INVENTION

Accordingly the present invention provides a surface effect vehicle having means for forming and maintaining a cushion of air beneath the structure of the craft to support it above a land or water surface, means for propelling the craft in a forward direction when so supported, and differentially operable aileron like flaps arranged to selectively exert a tilting moment on the craft about its longitudinal axis during such forward motion.

Preferably the craft is provided with a pair of propulsion fan units disposed one on each side of the craft, and the aileron like flaps are disposed in the slipstream of those fan units.

Preferably the fan units are in the form of ducted fan units and said flaps are each disposed horizontally in a respective fan duct.

Preferably the flaps are each movable at least between a normal position in which their plane is parallel to the axis of the duct and a fully operated position in which they extend across and substantially close off the respective fan duct.

The craft may be provided with one or more conventional rudders, which are preferably arranged one behind each propulsion unit to operate in the slipstream thereof.

The controls for the driver or pilot of the craft may be linked to operate the aileron flaps and rudders in a similar manner to that of an aircraft.

Preferably the controls selectively provide for the differential movement of the aileron like flaps and for movement of the flaps in unison in the manner of elevators to afford a fore and aft trimming moment acting on the craft when in motion.

Preferably the controls provide for the selective movement of the aileron like flaps to control the relative thrust and total thrust of the respective propulsion unit.

Preferably the linkage between the controls and the aileron like flaps is arranged so that during differential movement of the flaps the flap whose trailing edge is being raised is moved through a greater angle than the other for a given control movement.

BRIEF DESCRIPTION OF THE DRAWINGS

In order to promote a fuller understanding of the above, and other aspects of the present invention, an embodiment will now be described, by way of example only, with reference to the accompanying drawings, in which.

DESCRIPTION OF PREFERRED EMBODIMENTS

Figure 1:
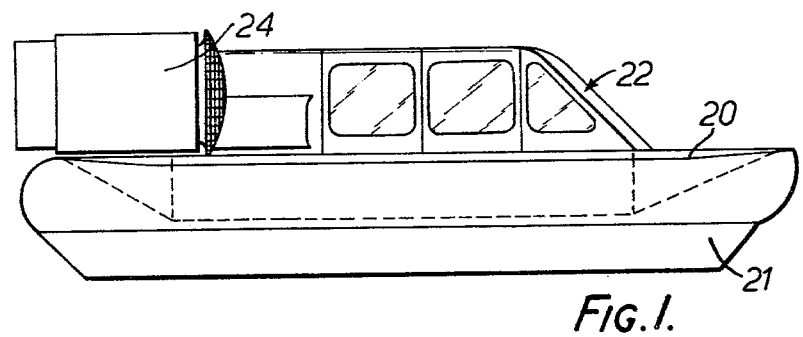
FIGS. 1, 2 and 3 show side elevation, plan elevation and front elevation respectively of a surface effect vehicle embodying the invention.
Figure 2:
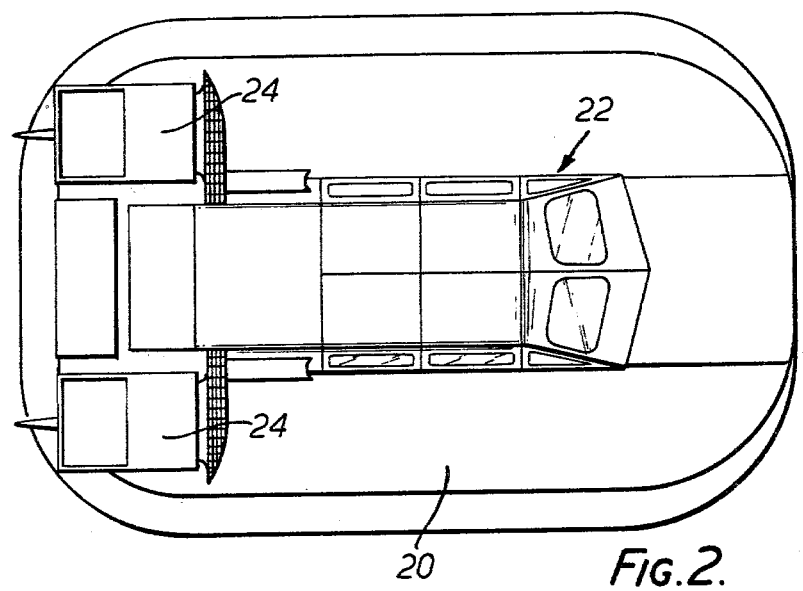
Figure 3:
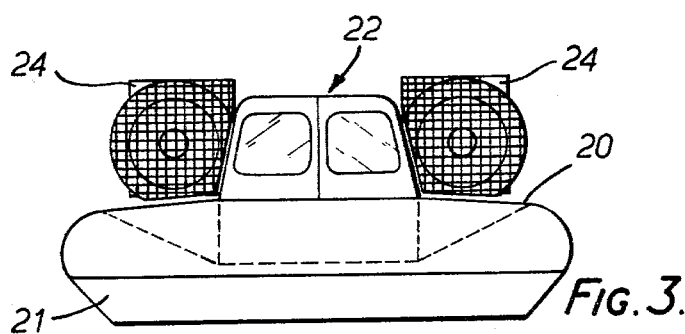

Referring first to FIGS. 1 to 3 there is shown a small surface effect vehicle embodying the invention designed to carry typically four persons over land or water. The surface effect vehicle comprises a hull structure indicated at 20 which is formed substantially from marine plywood and extruded aluminium angle sections, the mode of assembly being generally by bolted construction. The hull structure 20 is provided with a flexible skirt 21 the constructional details of which will be described in more detail below. The superstructure of the hull indicated at 22 is formed from glass fiber reinforced synthetic plastics material mouldings which are shown in more detail in FIG. 11. The moldings embody integral flanges which are utilized to bolt the various moldings together to form the superstructure, and which provide stiffening for the moldings and superstructure.

Towards the rear of the hull and superstructure are provided two propulsion units indicated at 24.

It is a feature of the construction of the hull and other parts of the vehicle that it can be assembled from, and broken down into, a series of individual components which are attached together by means of nuts and bolts or other releasable fixings, and each individual component is of such size that it can be transported readily in a light aircraft. This means that spare parts can be ferried by light aircraft for repair of the vehicles in remote places.

Figure 4:
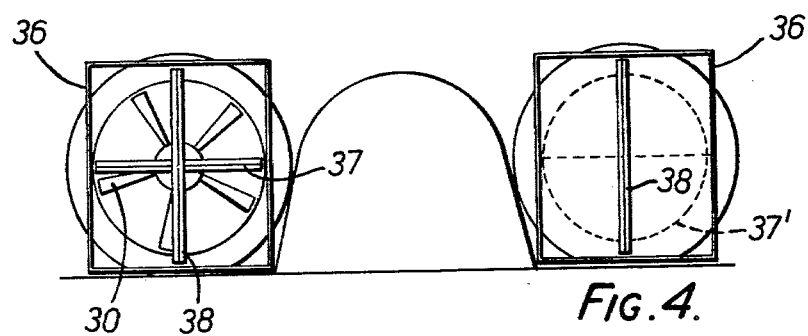
FIG. 4 shows a rear view of the propulsion units of the embodiment of FIGS. 1 to 3.
Figure 5:
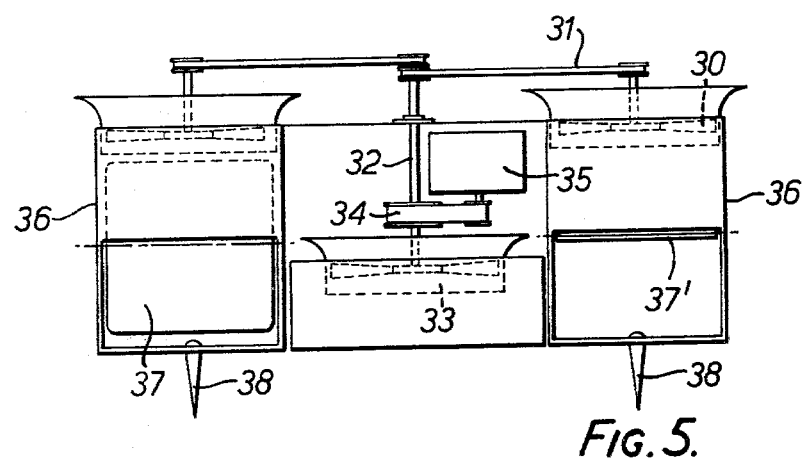
FIG. 5 shows a plan view of the propulsion units of FIG. 4.
Figure 6:
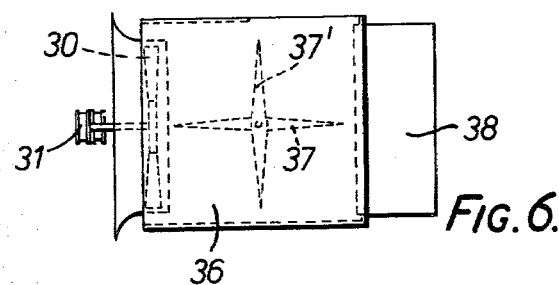
FIG. 6 shows a side elevation of the propulsion unit of FIG. 4.

FIGS. 4, 5 and 6 show in more detail the arrangement of the propulsion units 24. Each propulsion unit comprises a ducted fan unit indicated at 30 driven by means of a belt drive indicated at 31 from a lay shaft 32. The lay shaft 32 also carries a third ducted fan 33 which is arranged, in known manner per se, to provide air under pressure for the lift cushion of the craft, such air being enducted into the body of the craft through ducting indicated at 33a. The lay shaft 32 is driven by a gasoline engine 35. The belt drive 34 provides a primary reduction ratio between the engine and the lift fan 33, whereas the belt drive 31 provides a suitable ratio between the lay shaft 32 and the propulsion fans 30.

Each ducted fan unit 30 delivers air into a rectangular cross-section duct 36. The duct 36 is provided with a horizontally extending aileron like flap or elevon 37 pivotally mounted transverse to and in alignment with the axis of the fan unit 30. At the rear end of the duct 36 a rudder 38 is provided to be pivotable about a vertical axis. The elevons 37 are each arranged so that they are pivotable between a position of small positive incidence angle with their trailing edge downwards and an extreme negative incidence position indicated at 37' in which the plane of the elevon is transverse to the axis of the fan unit 30 and in which the elevon substantially closes off the duct 36. The elevons and rudders of the two propulsion units are coupled in suitable fashion similar to that known per se in aircraft to control handles of any suitable kind such as pedals and joy stick, for the driver or pilot of the craft. The elevons are arranged so as to be at least partially pressure counterbalanced to reduce control forces in operation.

Figure 7:
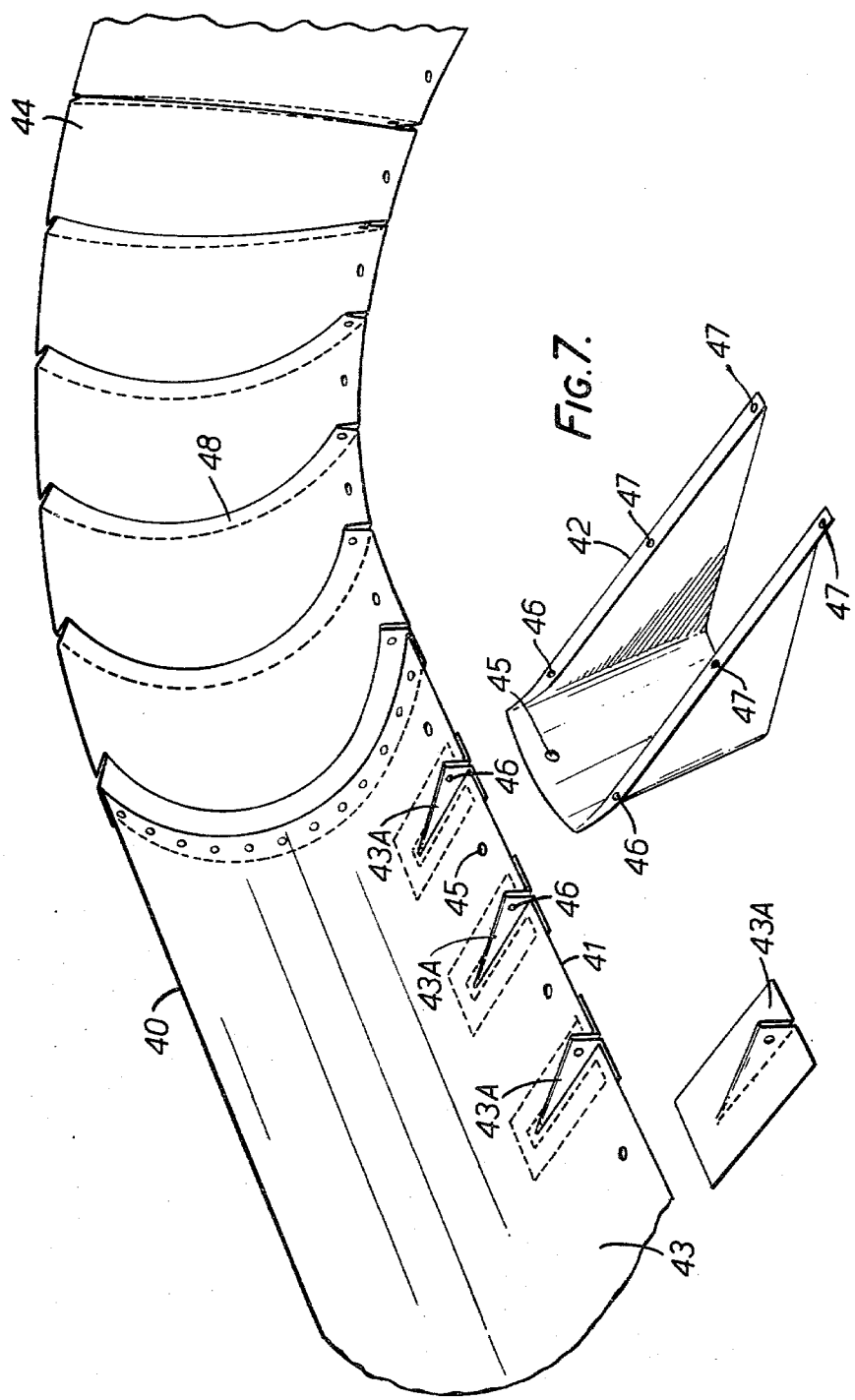
FIG. 7 shows in schematic detail the construction of the skirt of the hovercraft of FIGS. 1 to 3.
Figure 8:
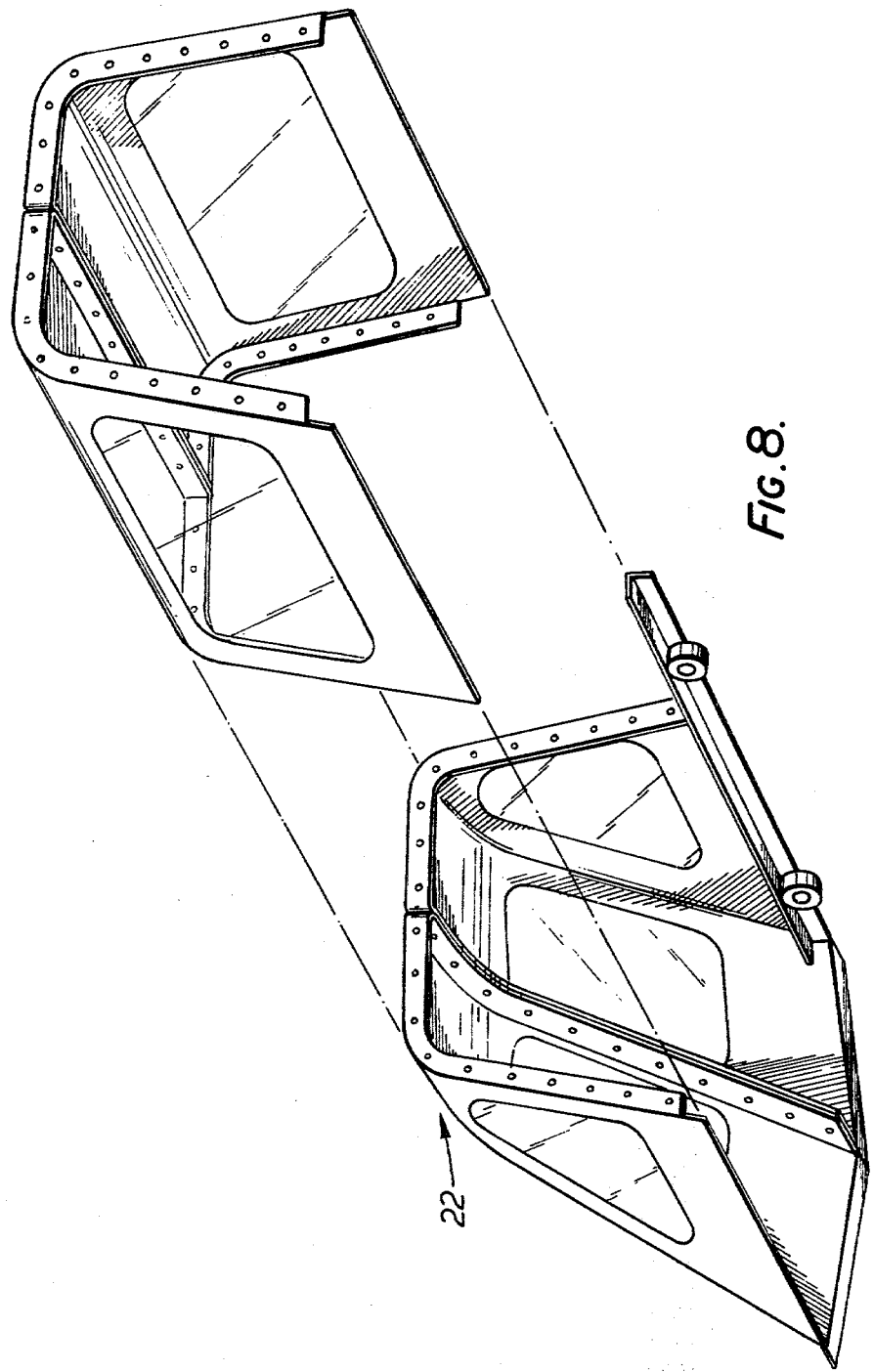
FIG. 8 shows details of the construction of the superstructure of the hovercraft for FIGS. 1 to 3, and FIGS. 9, 10 and 11 show respectively a rear view, a side view and a plan view of the surface effect vehicle of FIGS. 1 to 3 to illustrate the operation of the controls.

FIG. 7 of the drawings shows in more detail the construction of the skirt 21 of the hovercraft of FIGS. 1 to 3.

The hull structure of the craft provides a peripheral edge or gunwale to which the upper edge of the skirt indicated at 40 in FIG. 7 is attached. The skirt then forms a plenum chamber for lift air around the craft in conventional fashion per se. The lower edge 41 of the skirt is attached to a bottom plate of the hull of the craft by means of a series of fingers one of which is indicated at 42 in FIG. 7. The material for the skirt 21 and the fingers 42 may be any suitable flexible material but is preferably a rubber or synthetic plastics material impregnated fabric.

The skirt 21 comprises straight portions 43 running along the straight sides of the craft, and curved portions 44 extending around each end of the craft. The fingers 42 are attached to the lower edge 41 by suitable bolt fastenings, preferably nylon bolts so that individual fingers can be easily replaced. The fingers are each attached at a point indicated at 45 direct to the edge of the skirt material, and at two points indicated at 46 to attachment gussets 43A stitched and glued to the skirt material. The fingers are also attached at four further points 47 to a sheet of suitable flexible material which extends substantially horizontally from the lower edge 41 of the skirt portions 43 and 44 to the periphery of the hull bottom. This sheet is provided with apertures for the supply of air from the plenum chamber to the air cushion below the craft in known manner per se. Thus the fingers 42 contain air beneath the hull of the craft in operation of the craft to form an air cushion upon which the craft rides in operation all in known manner per se.

The curved portions 44 of the skirt are made from one piece of material tucked in to form ribs 48 to lose the excess material from a sheet of fabric to form the double curvature needed for the end portions of the skirt. The manner in which the ribs 48 are formed will be discussed below.

The fingers 42 are attached to the skirt around the curved portions in an exactly similar manner to that described above with the exception that the lower edges of the ribs 48 are used instead of the additional attachment gussets mentioned with respect to the straight portions.

Figure 9:
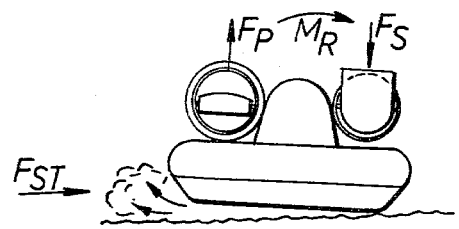
Figure 10:
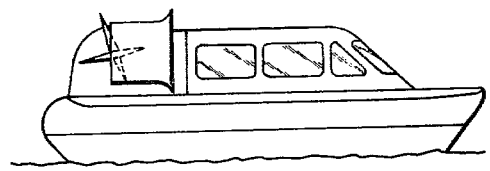

In operation of the hovercraft the rudders 38 are used to steer the vehicle in more or less conventional fashion. The elevons 37 are used to assist in the control of the craft in a manner generally similar to the use of ailerons in an aircraft. In this connection reference should be made to FIGS. 9, 10 and 11 of the accompanying drawings.

The arrangement of the linkage between the controls of the craft and the ailerons is such that the ailerons have a differential movement, so that when one aileron is moved with its trailing edge moving upwards the other aileron is moved so that its trailing edge moves downwards to a lesser extent. This situation continues until one aileron has moved to the transverse position mentioned above in the upward direction, whereas the other aileron has moved with its trailing edge downwards through a comparatively small angle of some 10 to 15 degrees.

Figure 11:
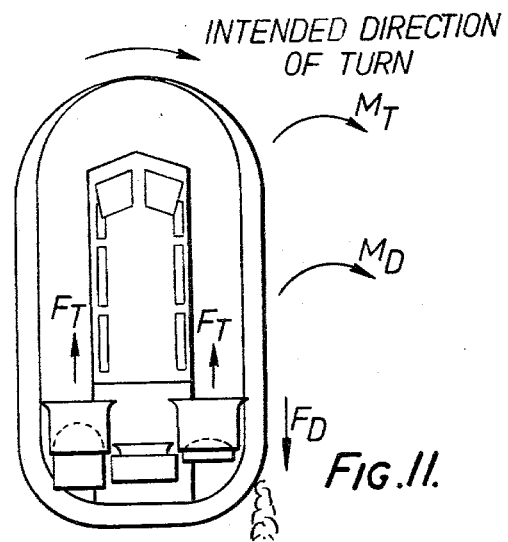

Thus when the driver of the craft wishes to turn to the right as indicated in plan view in FIG. 11, the driver operates his controls as if banking an aircraft to initiate the turn to starboard. The port aileron is caused to go down by a small amount while the starboard aileron goes up by a greater amount. This produces a rolling moment indicated at MR in the drawings acting into the desired turn. At the same time because the starboard aileron has gone up by a greater amount, and in so doing has closed off the respective duct 36 to a greater amount; a differential effective relative thrust between the propulsion fans is produced, producing a turning moment indicated at MT in the drawings to starboard. It can be seen that this turning moment assists the conventional operation of the rudder 38 during such a turn.

The rolling moment MR at the same time causes the craft to tip with the result that the skirt on the port side is lifted allowing lift air to escape. The resultant side thrust indicated at FST in FIG. 9 opposes side slip away from the centre of the turn as a result of centrifugal force. At the same time the skirt on the starboard side is forced more into the surface over which the craft is travelling producing a rearward drag force indicated at FD in FIG. 11 acting along the line of contact. This again induces a turning moment indicated at MD in the desired direction of turn. To turn in the opposite direction, that is to say, to the left, exactly the reverse procedure is adopted.

Thus it can be seen by the use of the aileron like flaps a positive control is exerted over the motion of the craft which is far superior to that provided by the use of a rudder alone.

The linkage between the controls of the craft and the ailerons also provide for them to be moved in synchronism to their up or down positions affording the possibility of trimming the craft in a fore and aft direction when in motion, again in a similar manner to an aircraft, to enable it to operate at a favorable angle of incidence under various operating and load conditions. Further the aileron like flaps can be used in synchronism to control the total thrust output of the propulsion units, thus affording a forward speed control over the craft without varying the speed of the drive engine. This is of particular significance in that the drive engine is also directly coupled to the lift air producing fan. Such an arrangement enables the use of a single drive motor for both lift producing purposes and forward motion with a simple drive arrangement between the motor and the various fan units which can be permanently coupled.

What I claim as my invention and desire to secure by Letters Patent is:

1. A surface effect vehicle having means for forming and maintaining a cushion of air beneath the structure of the craft to support it above a land or water surface;

means comprising two motor driven ducted fan units each having an aileron flap mounted for pivoting movement about a normally horizontal axis in the duct of the fan unit downstream of the fan, for propelling the craft in a forward direction when so supported;

wherein said aileron flaps are differentially operable to selectively exert a tilting movement in the craft about its longitudinal axis during such forward motion and in which each aileron flap is movable at least between a normal position in which its plane is parallel to the axis of the duct and a fully operated position in which it extends across and substantially closes the respective fan duct.

2. A vehicle as claimed in claim 1, in which each aileron flap may also move to a position angularly beyond the normal position from said fully operated position.

3. A vehicle as claimed in claim 1, in which said fully operated position is reached by the trailing edge of the flaps moving upwards from their normal position.

4. A vehicle as claimed in claim 1, in which the aileron flaps are at least partially mass counterbalanced about their pivot axis.

5. A vehicle as claimed in claim 1, in which the aileron flaps are at least partially pressure counterbalanced in operation.

6. A vehicle as claimed in claim 1 having at least one rudder arranged to exert directional control on the craft when in motion.

7. A vehicle as claimed in claim b, in which a rudder is provided behind each fan unit.

8. A vehicle as claimed in claim 6, including control means connected to the said at least one rudder for manipulation of said at least one rudder by a pilot of the craft.

9. A vehicle as claimed in claim 8, in which those control elements comprise foot-pedals.

10. A vehicle as claimed in claim 1 including control means in the form of a joy stick connected to the aileron flaps for their manipulation by a pilot of the craft.

11. A vehicle as claimed in claim 1, in which the aileron flaps may be moved in unison as well as differentially so as to act in the manner of elevators to afford a fore and aft trimming moment acting on the craft in operation.

12. A vehicle as claimed in claim 1, in which the aileron flaps may be moved so that during differential movement the flap whose trailing edge is being raised is moved through a greater angle than the flap whose trailing edge is being lowered.

13. A vehicle as claimed in claim 1, in which the aileron flaps may be moved to selectively control the relative thrust and total thrust of the fan units.

14. A vehicle as claimed in claim 1, in which the fan propulsion units are driven by a common motor with a fan unit arranged to provide the air cushion for the craft.

15. A vehicle as claimed in claim 14, in which the propulsion fan units and the lift fan unit are rotationally coupled together.

* * * * *